(12) United States Patent
Ekiz et al.

(10) Patent No.: US 11,444,882 B2
(45) Date of Patent: Sep. 13, 2022

(54) METHODS FOR DYNAMICALLY CONTROLLING TRANSMISSION CONTROL PROTOCOL PUSH FUNCTIONALITY AND DEVICES THEREOF

(71) Applicant: F5 Networks, Inc., Seattle, WA (US)

(72) Inventors: Nasif Ekiz, Seattle, WA (US); Martin Duke, Seattle, WA (US); Akihiko Maruse, Yokohama (JP); Aniket Dhobe, Seattle, WA (US)

(73) Assignee: F5, Inc., Seattle, WA (US)

( * ) Notice: Subject to any disclaimer, the term of this patent is extended or adjusted under 35 U.S.C. 154(b) by 0 days.

(21) Appl. No.: 16/834,145

(22) Filed: Mar. 30, 2020

(65) Prior Publication Data

US 2020/0336432 A1    Oct. 22, 2020

Related U.S. Application Data

(60) Provisional application No. 62/835,605, filed on Apr. 18, 2019.

(51) Int. Cl.
  *G06F 15/173* (2006.01)
  *H04L 47/283* (2022.01)
  (Continued)

(52) U.S. Cl.
  CPC ............ *H04L 47/283* (2013.01); *H04L 47/12* (2013.01); *H04L 67/55* (2022.05)

(58) Field of Classification Search
  CPC ....... H04L 47/283; H04L 47/12; H04L 67/26; H04L 67/22; H04L 69/161; H04L 69/16
  See application file for complete search history.

(56) References Cited

U.S. PATENT DOCUMENTS

2007/0064737 A1* 3/2007 Williams ................ H04L 69/12
                                                                370/473
2007/0206621 A1* 9/2007 Plamondon ......... H04L 67/2876
                                                                370/413

(Continued)

FOREIGN PATENT DOCUMENTS

EP          2642702 A1    9/2013

OTHER PUBLICATIONS

F5 Networks, Inc., "Big-IP® Local Traffic Management: Basics", Manual, Jan. 18, 2019, 60 pages, Version 13.0, F5 Networks, Inc.,Retrieved from the Internet:<https://techdocs.f5.com/kb/en-us/products/big-ip_ltm/manuals/product/ltm-basics-13-0-0.html>.

(Continued)

*Primary Examiner* — Suraj M Joshi
*Assistant Examiner* — Jaren Means
(74) *Attorney, Agent, or Firm* — Troutman Pepper Hamilton Sanders LLP

(57) ABSTRACT

Methods, non-transitory computer readable media, network traffic management apparatuses, and network traffic management systems that monitor one or more messages generated by an application or one or more characteristics of one or more transmission control protocol (TCP) connections with a destination device or a source device. A determination is made when a first TCP push flag should be set for a first packet associated with data based on the monitoring. The data is provided by the application. The first TCP push flag for the first packet is set prior to the first packet being sent to the destination device via a first one of the TCP connections, based on the determination that the first TCP push flag should be set for the first packet. Accordingly, this technology more effectively manages TCP push functionality to reduce acknowledgement messages (ACKs) and thereby improve network bandwidth and device resource utilization.

16 Claims, 5 Drawing Sheets

(51) Int. Cl.
  *H04L 47/12* (2022.01)
  *H04L 67/55* (2022.01)

(56) References Cited

U.S. PATENT DOCUMENTS

| | | | | |
|---|---|---|---|---|
| 2008/0091868 | A1* | 4/2008 | Mizrachi | G06F 13/24 710/263 |
| 2013/0041934 | A1* | 2/2013 | Annamalaisami | H04L 45/38 709/203 |
| 2013/0229916 | A1* | 9/2013 | Isobe | H04L 1/1835 370/230 |

OTHER PUBLICATIONS

F5 Networks, Inc., "Big-IP® Local Traffic Management: Getting Started with Policies", Manual, Dec. 27, 2017, 32 pages, Version 13.1, F5 Networks, Inc., Retrieved from the Internet:<https://techdocs.f5.com/kb/en-us/products/big-ip_ltm/manuals/product/bigip-local-traffic-policies-getting-started-13-1-0.html>.

F5 Networks, Inc., "Big-IP System: Configuring the System for Layer 2 Transparency", Manual, Jan. 25, 2019, 20 pages, Version 13.1, F5 Networks, Inc., Retrieved from the Internet:<https://techdocs.f5.com/kb/en-us/products/big-ip_ltm/manuals/product/bigip-virtual-wire-layer2-transparency-13-1-0.html>.

F5 Networks, Inc., "Big-IP Systems: Protecting against SYN Flood Attacks", Manual, Feb. 28, 2017, 14 pages, Version 13.0, F5 Networks, Inc., Retrieved from the Internet:<https://techdocs.f5.com/kb/en-us/products/big-ip_ltm/manuals/product/bigip-system-syn-flood-attacks-13-0-0.html>.

F5 Networks, Inc., "Big-IP® TMOS®: Routing Administration", Manual, Jan. 18, 2019, 126 pages, Version 13.1, F5 Networks, Inc., Retrieved from the Internet:<https://techdocs.f5.com/kb/en-us/products/big-ip_ltm/manuals/product/tmos-routing-administration-13-1-0.html>.

F5 Networks, Inc., "Big-IP Local Traffic Manager™: Implementations", Manual, Aug. 13, 2018, 180 pages, Verson 13.1, F5 Networks, Inc., Retrieved from the Internet:<https://techdocs.f5.com/kb/en-us/products/big-ip_ltm/manuals/product/ltm-implementations-13-1-0.html>.

F5 Networks, Inc., "Big-IP System: Essentials", Manual, Apr. 23, 2018, 48 pages, Version 13.1, F5 Networks, Inc., Retrieved from the Internet:<https://techdocs.f5.com/kb/en-us/products/big-ip_ltm/manuals/product/bigip-system-essentials-13-1-0.html>.

F5 Networks, Inc., "Big-IP® TMOS®: Implementations", Manual, Mar. 2, 2017, 72 pages, Version 13.0, F5 Networks, Inc., Retrieved from the Internet:<https://techdocs.f5.com/kb/en-us/products/big-ip_ltm/manuals/product/tmos-implementations-13-0-0.html>.

EP Search Report for corresponding EP Application No. 20169475.9, dated Sep. 22, 2020.

Extended European Search Report for EP Application No. 21170209.7, dated Sep. 1, 2021.

* cited by examiner

METHODS FOR DYNAMICALLY CONTROLLING TRANSMISSION CONTROL PROTOCOL PUSH FUNCTIONALITY AND DEVICES THEREOF

This application claims the benefit of U.S. Provisional Patent Application Ser. No. 62/835,605, filed Apr. 18, 2019, which is hereby incorporated by reference in its entirety.

FIELD

This technology generally relates to network traffic management and, more particularly, to methods and devices for controlling Transmission Control Protocol (TCP) push functionality to improve network resource utilization.

BACKGROUND

Transmission Control Protocol (TCP) is commonly used in communication networks to transmit data between network devices. Within a TCP connection, a sending device can set a TCP push flag for a TCP segment, referred to herein as a packet. The TCP push flag is a control bit that causes a TCP layer of a protocol stack at a destination device to push data to a receiving application executing on the destination device. The TCP push flag is generally set for the last packet from a send buffer at the sending device. Upon receipt of a packet with a TCP push flag set, a destination device pushes buffered data up a protocol stack to a destination receiving application and returns an acknowledgement message (ACK) to the sending device.

Depending on how the data is read from the sending application, and the Nagle algorithm mode at the sending device, among other factors, a significant number of sent packets may have the TCP push flag set. Sending a large number of packets with a set TCP push flag may not optimize or meaningfully reduce delay observed by a receiving application, but will result in the corresponding transmission of a significant number of ACKs as many TCP implementations acknowledge every packet with a set TCP push flag. Transmitting a relatively large number of ACKs wastes resources, including processor cycles, power (e.g., on handset devices), and network bandwidth that could have been used for other network traffic.

SUMMARY

A method for managing transmission control protocol (TCP) functionality is disclosed that is implemented by a network traffic management system, including one or more network traffic management apparatuses, server devices, or client devices, and includes monitoring messages generated by an application or one or more characteristics of one or more TCP connections with a destination device or a source device. A determination is made when a first TCP push flag should be set for a first packet associated with data based on the monitoring. The data is provided by the application. The first TCP push flag for the first packet is set prior to the first packet being sent to the destination device via a first one of the TCP connections, based on the determination that the first TCP push flag should be set for the first packet.

A network traffic management apparatus is disclosed that includes memory including programmed instructions stored thereon and one or more processors configured to be capable of executing the stored programmed instructions to monitor messages generated by an application or one or more characteristics of one or more TCP connections with a destination device or a source device. A determination is made when a first TCP push flag should be set for a first packet associated with data based on the monitoring. The data is provided by the application. The first TCP push flag for the first packet is set prior to the first packet being sent to the destination device via a first one of the TCP connections, based on the determination that the first TCP push flag should be set for the first packet.

A non-transitory computer readable medium is disclosed that has stored thereon instructions for managing TCP functionality includes executable code that, when executed by one or more processors, causes the processors to monitor messages generated by an application or one or more characteristics of one or more TCP connections with a destination device or a source device. A determination is made when a first TCP push flag should be set for a first packet associated with data based on the monitoring. The data is provided by the application. The first TCP push flag for the first packet is set prior to the first packet being sent to the destination device via a first one of the TCP connections, based on the determination that the first TCP push flag should be set for the first packet.

A network traffic management system is disclosed that includes one or more network traffic management apparatuses, server devices, or client devices with memory including programmed instructions stored thereon and one or more processors configured to be capable of executing the stored programmed instructions to monitor messages generated by an application or one or more characteristics of one or more TCP connections with a destination device or a source device. A determination is made when a first TCP push flag should be set for a first packet associated with data based on the monitoring. The data is provided by the application. The first TCP push flag for the first packet is set prior to the first packet being sent to the destination device via a first one of the TCP connections, based on the determination that the first TCP push flag should be set for the first packet.

This technology has a number of associated advantages including methods, non-transitory computer readable media, and network traffic management systems and apparatuses that optimize TCP push functionality to reduce acknowledgement (ACK) traffic. This technology dynamically controls the setting of TCP push flags for packets to minimize delay for a receiving application at a destination device while reducing ACKs. Reducing ACKs advantageously reduces processor cycles required to process the ACK messages as well as network bandwidth required to transmit the ACK messages

DETAILED DESCRIPTION

Figure 1:
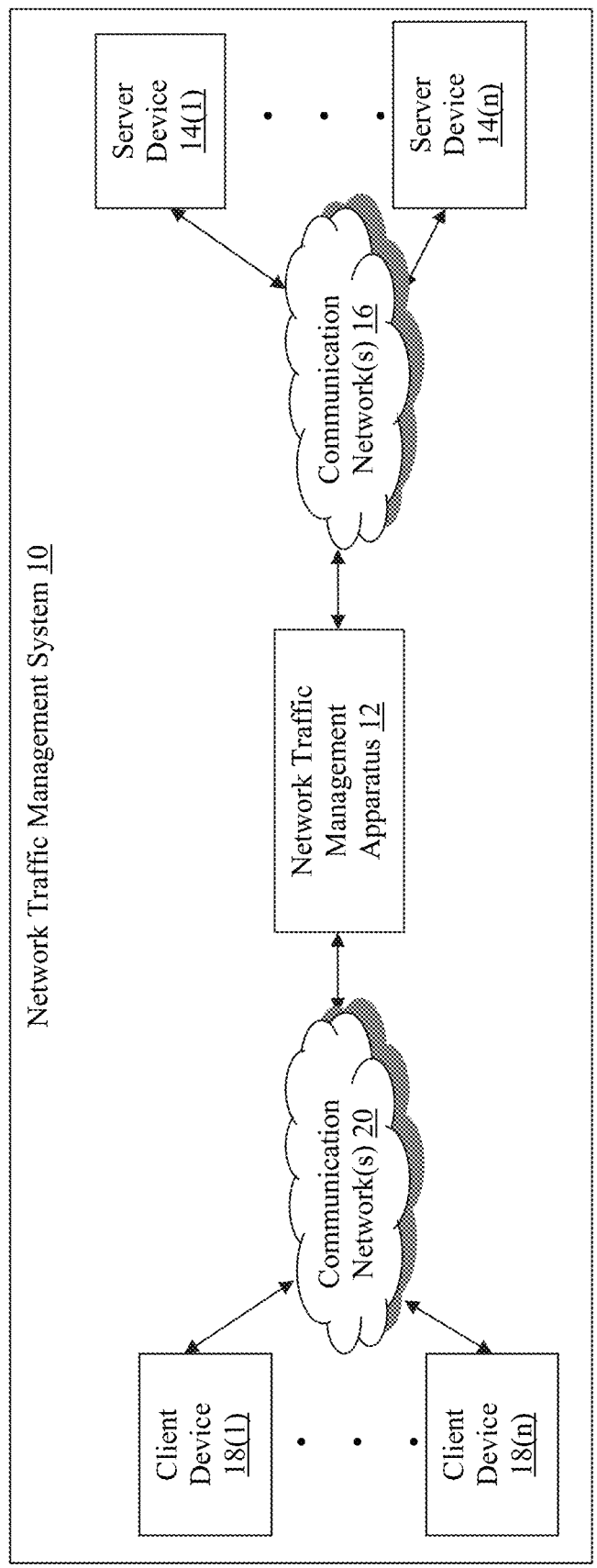
FIG. 1 is a block diagram of an exemplary network traffic management system with a network traffic management apparatus.

Referring to FIG. 1, an exemplary network traffic management system 10 is illustrated. The network traffic management system 100 in this example includes a network traffic management apparatus 12 that is coupled to server devices 14(1)-14(n) via communication network(s) 16 and client devices 18(1)-18(n) via communication network(s) 20, although the network traffic management apparatus 12, server devices 14(1)-14(n), and client devices 18(1)-18(n) may be coupled together via other topologies. The network traffic management system 10 also may include other network devices such as routers or switches, for example, which are known in the art and thus will not be described herein. This technology provides a number of advantages including methods, non-transitory computer readable media, and network traffic management apparatuses and systems that dynamically manage the setting of Transmission Control Protocol (TCP) push flags based on network and/or application characteristics to improve resource utilization without introducing significant delay for receiving applications.

In this particular example, the network traffic management apparatus 12, server devices 14(1)-14(n), and client devices 18(1)-18(n) are disclosed in FIG. 1 as dedicated hardware devices. However, one or more of the network traffic management apparatus 12, server devices 14(1)-14(n), or client devices 18(1)-18(n) can also be implemented in software within one or more other devices in the network traffic management system 10. For example, the network traffic management apparatus 12 can be hosted by one or more of the server devices 14(1)-14(n), and other network configurations can also be used.

Figure 2:
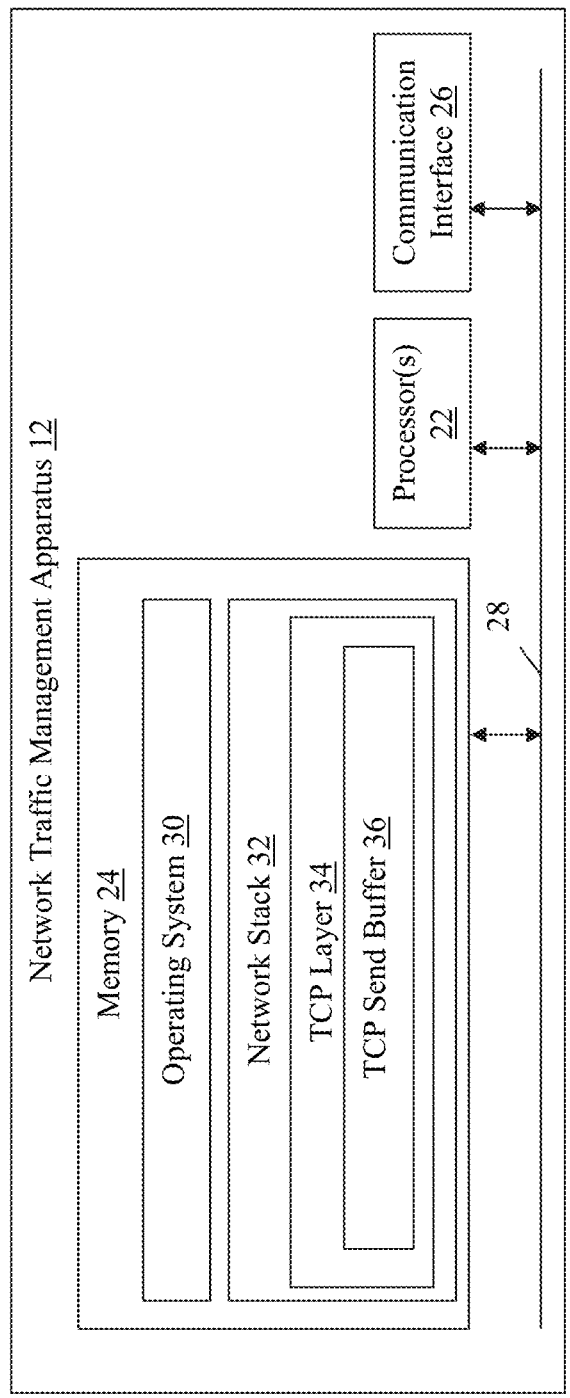
FIG. 2 is a block diagram of an exemplary network traffic management apparatus.

Referring to FIGS. 1-2, the network traffic management apparatus 12 of the network traffic management system 10 may perform any number of functions, including providing network security, load balancing network traffic across the server devices 14(1)-14(n), proxying connections between the client devices 18(1)-18(n) and server devices 14(1)-14(n), or accelerating network traffic associated with applications hosted by the server devices 14(1)-14(n), for example. The network traffic management apparatus 12 in this example includes processor(s) 22, memory 24, and a communication interface 26, which are coupled together by a bus 28, although the network traffic management apparatus 12 can include other types or numbers of elements in other configurations.

The processor(s) 22 of the network traffic management apparatus 12 may execute programmed instructions stored in the memory 24 of the network traffic management apparatus 12 for any number of functions described and illustrated herein. The processor(s) 22 of the network traffic management apparatus 12 may include one or more central processing units (CPUs) with one or more processing cores, for example, although other types of processor(s) can also be used.

The memory 24 of the network traffic management apparatus 12 stores these programmed instructions for one or more aspects of the present technology as described and illustrated herein, although some or all of the programmed instructions could be stored elsewhere. A variety of different types of storage devices, such as random access memory (RAM), read only memory (ROM), hard disk drives (HDDs), solid state drives (SSDs), flash memory, or other computer readable medium which is read from and written to by a magnetic, optical, or other reading and writing system that is coupled to the processor(s) 22, can be used for the memory 24.

Accordingly, the memory 24 of the network traffic management apparatus 12 can store one or more modules that can include computer executable instructions that, when executed by the network traffic management apparatus 12, cause the network traffic management apparatus 12 to perform actions, such as to transmit, receive, or otherwise process messages, for example, and to perform other actions described and illustrated below with reference to FIGS. 3-5. The modules can be implemented as components of other modules. Further, the modules can be implemented as applications, operating system extensions, plugins, or the like.

Even further, the modules may be operative in a cloud-based computing environment. The modules can be executed within or as virtual machine(s) or virtual server(s) that may be managed in a cloud-based computing environment. Also, the modules, and even the network traffic management apparatus 12 itself, may be located in virtual server(s) running in a cloud-based computing environment rather than being tied to one or more specific physical network computing devices. Also, the modules may be running in one or more virtual machines (VMs) executing on the network traffic management apparatus 12. Additionally, in one or more examples of this technology, virtual machine(s) running on the network traffic management apparatus 12 may be managed or supervised by a hypervisor.

In this particular example, the memory 24 of the network traffic management apparatus 12 includes an operating system 30 and a network stack 32 with a TCP layer 34 that includes a TCP send buffer 36, although the memory 24 can include other policies, modules, databases, or applications, for example. The operating system 30 can execute applications and control the general operation and tasks performed by the network traffic management apparatus 12, for example, including proxying TCP connections between the client devices 18(1)-18(n) and the server devices 14(1)-14(n). In one example, the operating system 30 can be a traffic management microkernel (TMM) provided by F5 Networks, Inc. of Seattle, Wash., although other types of operating systems can also be used in other examples.

The operating system 30 and/or other applications executed by the network traffic management apparatus 12 can generate application data that is communicated to an upper layer or module of the network stack 32 to subsequently be packetized by the TCP layer 34, buffered in the TCP send buffer 36, and sent to a remote or destination device, such as one of the client devices 18(1)-18(n) or one of the server devices 14(1)-14(n). In addition to the TCP layer 34, the network stack 32 can include a plurality of other layers or modules configured to communicate between each other in order to facilitate the transmission of data across the communication network(s) 16 and/or 20, for example. Accordingly, the network stack 32, also referred to as a protocol stack, includes software implementations for a plurality of network communication protocols.

In this example in which the network traffic management apparatus 12 acts as a proxy between the server devices 14(1)-14(n) and the client devices 18(1)-18(n), the network traffic management apparatus 12 may receive packets from the server devices 14(1)-14(n) with header and payload data contained therein, process the packets using the operating system 30, and generate and send new packets to the client devices 18(1)-18(n) in order to communicate the data to the client devices 18(1)-18(n). In other examples, the packets may be received by the network traffic management apparatus 12 from the client devices 18(1)-18(n) and proxied to the server devices 14(1)-14(n), and other arrangements are also possible in other examples.

The TCP layer 32 in particular may receive application data from a higher or upper layer of the network stack 32 (e.g., a Hypertext Transfer Protocol (HTTP) layer), which is then packetized. The TCP layer 34 with this technology advantageously automatically and dynamically optimizes setting of TCP push flags in packets to improve processor and network bandwidth utilization, as described and illustrated in more detail later with reference to FIGS. 3-5.

Referring back to FIGS. 1-2, the communication interface 26 of the network traffic management apparatus 12 operatively couples and communicates between the network traffic management apparatus 12, server devices 14(1)-14(n), and client devices 18(1)-18(n), which are coupled together at least in part by the communication network(s) 16 and 20, although other types or numbers of communication networks or systems with other types or numbers of connections or configurations to other devices or elements can also be used.

By way of example only, the communication network(s) 16 and/or 20 can include local area network(s) (LAN(s)) or wide area network(s) (WAN(s)), and can use TCP/IP over Ethernet and industry-standard protocols, although other types or numbers of protocols or communication networks can be used. The communication network(s) 16 and/or 20 in this example can employ any suitable interface mechanisms and network communication technologies including, for example, Ethernet-based Packet Data Networks (PDNs) and the like.

While the network traffic management apparatus 12 is illustrated in this example as including a single device, the network traffic management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus 12.

Additionally, one or more of the devices that together comprise the network traffic management apparatus 12 in other examples can be standalone devices or integrated with one or more other devices or apparatuses, such as one or more of the server devices 14(1)-14(n), for example. Moreover, one or more of the devices of the network traffic management apparatus 12 in these examples can be in a same or a different communication network including one or more public, private, or cloud networks, for example.

Each of the server devices 14(1)-14(n) of the network traffic management system 10 in this example includes processor(s), a memory, and a communication interface, which are coupled together by a bus or other communication link (not illustrated), although other numbers or types of components could be used. The server devices 14(1)-14(n) in this example can include application servers or database servers, for example, although other types of server devices can also be included in the network traffic management system 10.

Accordingly, in some examples, one or more of the server devices 14(1)-14(n) process login and other requests received from the client devices 18(1)-18(n) via the communication network(s) 20 according to the HTTP-based application RFC protocol, for example. A web application may be operating on one or more of the server devices 14(1)-14(n) and transmitting data (e.g., files or web pages) to the client devices 18(1)-18(n) (e.g., via the network traffic management apparatus 12) in response to requests from the client devices 18(1)-18(n). The server devices 14(1)-14(n) may be hardware or software or may represent a system with multiple servers in a pool, which may include internal or external networks.

Although the server devices 14(1)-14(n) are illustrated as single devices, one or more actions of each of the server devices 14(1)-14(n) may be distributed across one or more distinct network computing devices that together comprise one or more of the server devices 14(1)-14(n). Moreover, the server devices 14(1)-14(n) are not limited to a particular configuration. Thus, the server devices 14(1)-14(n) may contain network computing devices that operate using a master/slave approach, whereby one of the network computing devices of the server devices 14(1)-14(n) operate to manage or otherwise coordinate operations of the other network computing devices. The server devices 14(1)-14(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 14(1)-14(n) can operate within the network traffic management apparatus 12 itself rather than as a stand-alone server device communicating with the network traffic management apparatus 12 via communication network(s) 16. In this example, the one or more of the server devices 14(1)-14(n) operate within the memory 24 of the network traffic management apparatus 12.

The client devices 18(1)-18(n) of the network traffic management system 10 in this example include any type of computing device that can exchange network data, such as mobile, desktop, laptop, or tablet computing devices, virtual machines (including cloud-based computers), or the like. Each of the client devices 18(1)-18(n) in this example includes a processor, a memory, and a communication interface, which are coupled together by a bus or other communication link (not illustrated), although other numbers or types of components could also be used.

The client devices 18(1)-18(n) may run interface applications, such as standard web browsers or standalone client applications, which may provide an interface to make requests for, and receive content stored on, one or more of the server devices 14(1)-14(n) via the communication network(s) 16 and 20. The client devices 18(1)-18(n) may further include a display device, such as a display screen or touchscreen, and/or an input device, such as a keyboard, for example (not illustrated).

Although the exemplary network traffic management system 10 with the network traffic management apparatus 12, server devices 14(1)-14(n), client devices 18(1)-18(n), and communication network(s) 16 and 20 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the network traffic management apparatus 12, server devices 14(1)-14(n), or client devices 18(1)-18(n), for example, may be configured to operate as virtual instances on the same physical machine. In other words, one or more of the network traffic management apparatus 12, server devices 14(1)-14(n), or client devices 18(1)-18(n) may operate on the same physical device rather than as separate devices communicating through communication network(s) 16 and/or 20. Additionally, there may be more or fewer network traffic management apparatuses, client devices, or server devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

The examples also may be embodied as one or more non-transitory computer readable media having instructions stored thereon, such as in the memory 24 of the network traffic management apparatus 12, for one or more aspects of the present technology, as described and illustrated by way of the examples herein. The instructions in some examples include executable code that, when executed by one or more processors, such as the processor(s) 22 of the network traffic management apparatus 12, cause the processors to carry out steps necessary to implement the methods of the examples of this technology that are described and illustrated herein.

An exemplary method of dynamically controlling TCP push functionality will now be described with reference to FIGS. 1-5. Referring more specifically to FIG. 3, an example of a method of transmitting packetized application data with the TCP layer 34 of the network stack 32 is illustrated. In step 300 in this example, the network traffic management apparatus 12 of the network traffic management system 10 determines whether the TCP send buffer 36 is empty. The TCP send buffer 36 in this example stores packetized application data. The application data could have been generated by the operating system 30 or another hosted application according to an application layer protocol above the TCP layer (e.g., HTTP), which was then processed by the network stack 32, for example, although the TCP send buffer 36 could have been populated in other ways.

If the network traffic management apparatus 12 determines that the TCP send buffer 36 is empty, then the Yes branch is taken back to step 300 and the TCP layer 34 of the network traffic management apparatus 12 effectively waits for packetized application data to be generated and inserted into the TCP send buffer 36. However, if the network traffic management apparatus 12 determines in step 300 that the TCP send buffer 36 is not empty, then the No branch is taken to step 302.

In step 302, the network traffic management apparatus 12 retrieves a packet from the TCP send buffer 36. The packet corresponds to a TCP segment in this example and includes header information as well as a payload. The payload can include a portion of the application data to be transmitted to a destination device, such as one of the client devices 18(1)-18(n), for example. In some examples, the payload includes a portion of data communicated by one of the server devices 14(1)-14(n) to be analyzed, modified, or otherwise proxied by the network traffic management apparatus 12 to a requesting one of the client devices 18(1)-18(n), although other types of application data can also be packetized in the TCP send buffer 36 in other examples.

In step 304, the network traffic management apparatus 12 determines whether a TCP push flag is required to be set for the packet retrieved from the TCP send buffer 36. An exemplary method for determining in step 304 whether the TCP push flag is required to be set is described and illustrated in more detail later with reference to FIG. 4. If the network traffic management apparatus 12 determines that the TCP push flag should be set for the packet retrieved in step 302, then the Yes branch is taken to step 306.

In step 306, the network traffic management apparatus 12 sets the TCP push flag for the packet. In one example, the TCP push flag is a control bit that is set in the header of the packet, which indicates to a destination device (e.g., one of the client devices 18(1)-18(n)) that the packet should be pushed to a receiving application executing on the destination device. In some examples, received packets are buffered at a destination device and the TCP push flag indicates to the destination device that the buffer should be cleared such that the contents are pushed to a receiving application. Subsequent to setting the TCP push flag for the packet, or if the network traffic management apparatus 12 determines in step 304 that the TCP push flag does not need to be set for the packet and the No branch is taken, then the network traffic management apparatus 12 proceeds to step 308.

In step 308, the network traffic management apparatus 12 sends the packet to the destination device, such as one of the client devices 18(1)-18(n), for example. The destination device is identified in a header of the packet (e.g., by a destination Internet Protocol (IP) address) and the packet can be sent via the communication network(s) 20 in this example. Subsequent to sending the packet, the network traffic management apparatus 12 proceeds back to step 300 in this example. In other examples, one or more of steps 300-308 can be performed in a different order or in parallel for any number of packets.

Figure 3:
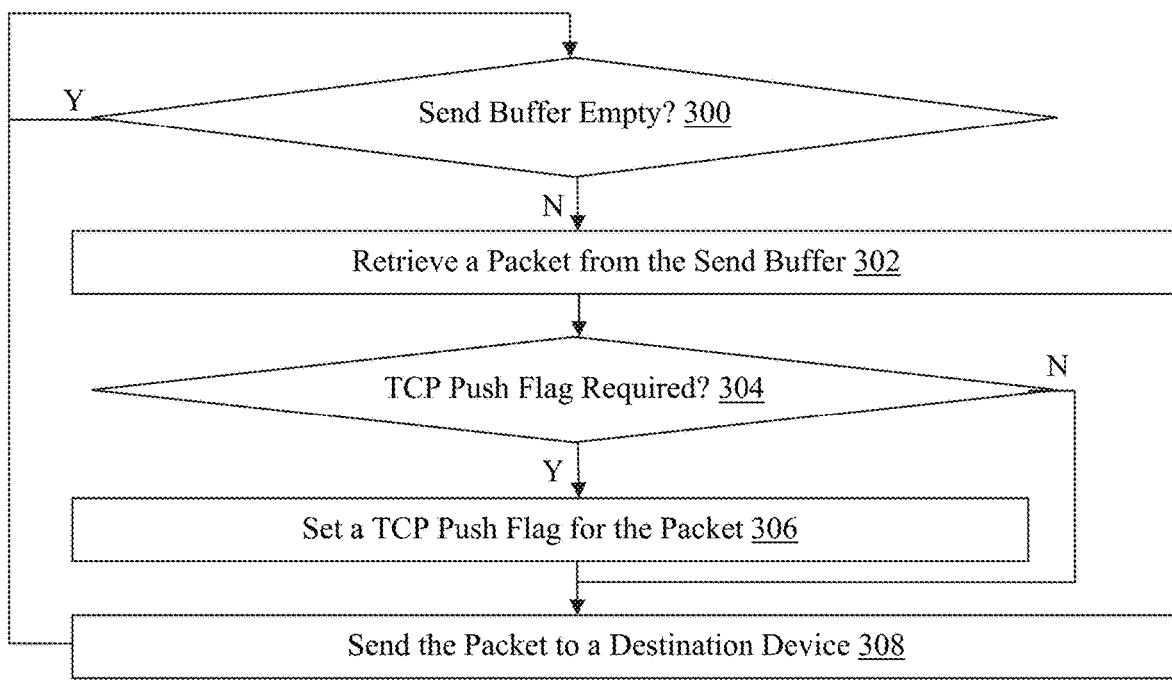
FIG. 3 is a flowchart of an exemplary method for transmitting packetized application data with a Transmission Control Protocol (TCP) layer of a network stack.
Figure 4:
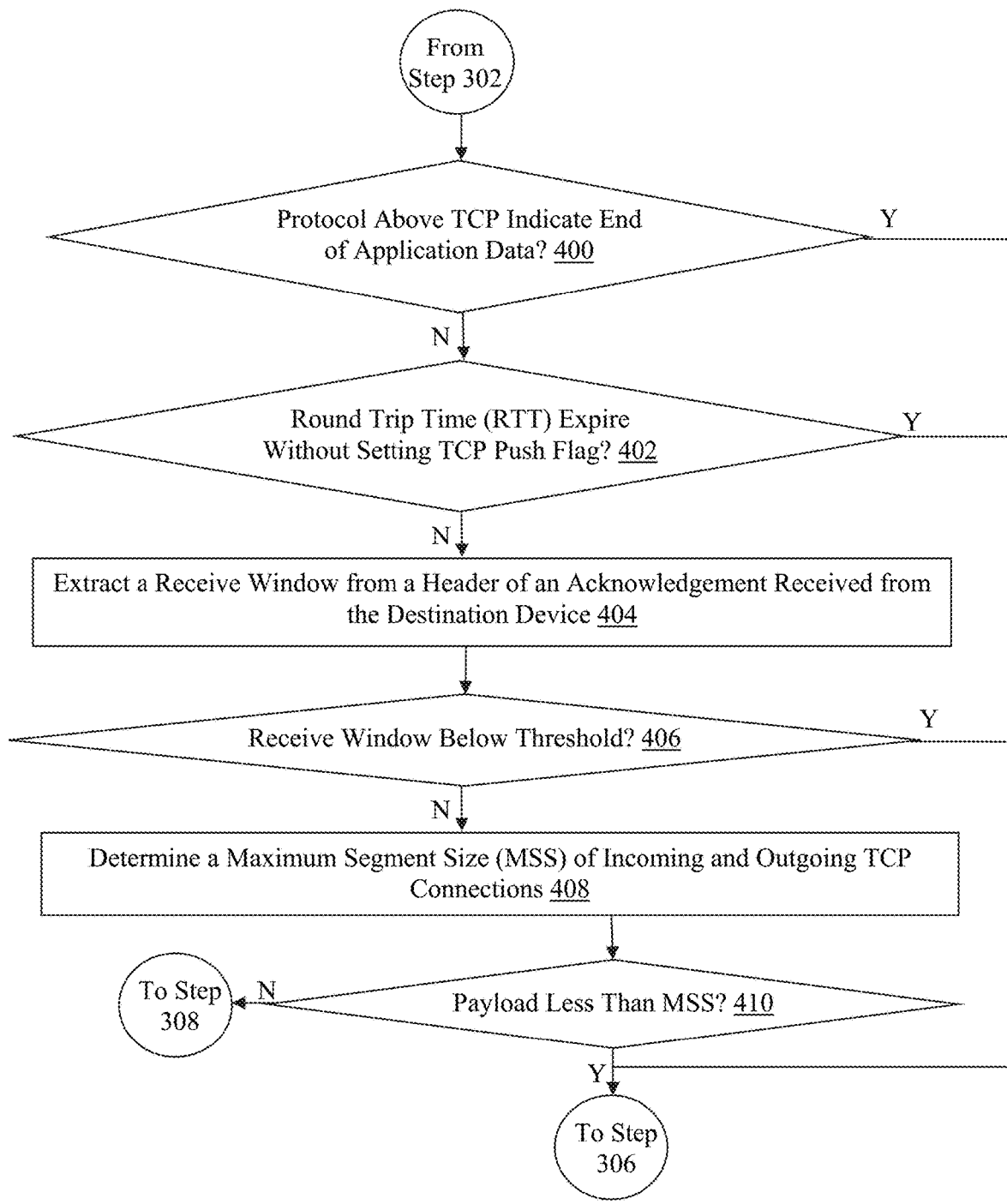
FIG. 4 is a flowchart of an exemplary method for determining whether to set a TCP push flag for a particular packet.

Referring more specifically to FIG. 4, an example of a method of determining whether to set a TCP push flag in step 304 of FIG. 3 for a particular packet is illustrated. In step 400 in this example, the network traffic management apparatus 12 of the network traffic management system 10 determines whether a network protocol layer above the TCP layer 34 in the network stack (e.g., an HTTP layer) has communicated message(s) to the TCP layer 34 indicating an end of a current transmission of application data. Accordingly, the determination in step 400 can be based on monitoring messages received by the TCP layer 34 from the network protocol layer above the TCP layer 34, for example.

In one example, an HTTP protocol layer is above the TCP layer 34 in the network stack 32 and is configured to communicate application data and end of application data messages to the TCP layer 34, although other network protocol layers can also exist in the network stack (e.g., Secure Sockets Layer (SSL)) and be configured to communicate message(s) indicating an end of the transmission of application data in other examples. If the network traffic management apparatus 12 determines that a network protocol layer above the TCP layer 34 in the network stack 32 has communicated message(s) indicating an end of the transmission of application data, then the Yes branch is taken to step 306 of FIG. 3.

As described and illustrated earlier, the TCP push flag is set for the packet in step 306. Accordingly, if the network protocol layer above the TCP layer 34 in the network stack 32 has communicated an end of a current application data transmission, then the network traffic management apparatus 12 sets the TCP push flag to prompt the destination device (e.g., one of the client devices 18(1)-18(n)) to push the payload data associated with the packet, and any other payload data that may have been previously transmitted and is currently buffered, to the receiving application executing at the destination device. Although the end of application data is not always communicated to the TCP layer 34, it is a relatively good indicator that the data should be pushed to the receiving application.

When the TCP send buffer 36 is an empty state, the TCP layer 34 is more likely to receive application data in a relatively short period of time as compared to when the network protocol layer above the TCP layer 34 in the network stack 32 communicates that it has completed a current transmission of application data. Accordingly, setting a TCP push flag upon emptying of the TCP send buffer 36 may result in an increased number of acknowledgement messages (ACKs) from the destination device.

By utilizing the communication of a completion of a current transmission of application data as an indicator instead, delay experienced by the receiving application at the destination device can be managed relatively effectively while the number of ACKs also can be reduced. Referring back to step 400 in FIG. 4, if the network traffic management apparatus 12 determines that a network protocol layer above the TCP layer 34 in the network stack 32 has not communicated message(s) to the TCP layer 34 indicating an end of a current transmission of application data, then the No branch is taken to step 402.

In step 402, the network traffic management apparatus 12 determines whether a current round trip time (RTT) has expired without a TCP push flag being set for any packet associated with a TCP connection with a destination device (e.g., one of the client devices 18(1)-18(n)). The network traffic management apparatus 12 can generate, or otherwise obtain from the memory 24, an RTT for the TCP connection with the destination device. The implementation of the TCP layer 34 in this example is configured to maintain performance metrics for the TCP connection, including RTT, based on monitored sent packets and received ACKs. The RTT can be a current or average RTT and can be generated dynamically or periodically and stored in the memory 24, and other methods for generating or obtaining the RTT can also be used in other examples.

In this example, the TCP layer 34 is configured to maintain an indication of whether a TCP push flag has been set for a packet, which is reset upon each expiration of an RTT. The indication can be a bit or flag that informs the determination in step 402. If the network traffic management apparatus 12 determines in step 402 that the RTT has expired without a TCP push flag being set for a packet, then the Yes branch is taken to step 306 of FIG. 3.

In step 306, the network traffic management apparatus 12 sets the TCP push flag for the packet removed from the TCP send buffer 36, as described and illustrated in more detail earlier. In examples in which the condition in step 402 is tested, the network traffic management apparatus 12 can set the indication of whether a TCP push flag has been set for a packet in a current RTT in step 306 of FIG. 3 for each first packet transmitted within an RTT that has a set TCP push flag, and can automatically reset the indication upon expiration of each RTT.

Accordingly, the network traffic management apparatus 12 in this example facilitates reduced delay for the receiving application at the destination device by provoking the destination device to push data at least once each RTT to the receiving application. Referring back to FIG. 4, if the network traffic management apparatus 12 determines in step 402 that a TCP push flag has been set for a packet within a current RTT, then the No branch is taken to step 404.

In step 404, the network traffic management apparatus 12 extracts a receive window from a header of an ACK received from the destination device (e.g., one of the client devices 18(1)-18(n)). The receive window is advertised by the destination device in ACKs received by the network traffic management apparatus 12. A relatively small receive window can be an indication that the receiving application executing on the destination device is not reading transmitted data fast enough. In other words, a relatively small receive window often indicates that application data is being pushed to the receiving application too slowly.

In step 406, the network traffic management apparatus 12 determines whether the receive window is below a threshold. The threshold can be static, configurable, and/or dynamic. Optionally, the threshold can be based on a maximum segment size (MSS) advertised in ACKs by the destination device. In one particular example, the threshold is a multiple of three of the MSS, although any other threshold receive window size indicating that the receiving application has capacity to read application data at a quicker rate can be used.

If the network traffic management apparatus 12 determines that the receive window advertised by the destination device is below a threshold, then the Yes branch is taken to step 306 of FIG. 3, and the TCP push flag is set for the packet by the network traffic management apparatus 12 prior to transmission of the packet to the destination device, as described and illustrated in more detail earlier. Accordingly, the TCP push flag is set for outgoing packets when the receive window is relatively small to prompt the destination device to push data to the receiving application to reduce any delay that the receiving application may be experiencing. Referring back to FIG. 4, if the network traffic management apparatus 12 determines in step 406 that the receive window is not below the threshold, then the No branch is taken to step 408.

In step 408, the network traffic management apparatus 12 determines an MSS of incoming and outgoing TCP connections. In this example, the network traffic management apparatus 12 is a full proxy terminating an incoming TCP connection with one of the server devices 14(1)-14(n) and an outgoing TCP connection with one of the client devices 18(1)-18(n) that has requested resources from the one of the server devices 14(1)-14(n). The MSS can be determined based on header information included in packets communicated to the network traffic management apparatus 12 via the incoming and outgoing TCP connections, for example.

In step 410, the network traffic management apparatus 12 determines whether the payload of the current packet retrieved from the TCP send buffer 36 is less than both MSS s of the incoming and outgoing TCP connections. A payload data size less than the MSS of the incoming and outgoing TCP connections is an indicator that the data represents the end of a current transmission of data from the sending application. If the network traffic management apparatus 12 determines in step 410 that the payload data size is less than the MSS of the incoming and outgoing TCP connections, then the Yes branch is taken to step 306 of FIG. 3.

In step 306 of FIG. 3, the network traffic management apparatus sets the TCP push flag for the packet, as described and illustrated in more detail earlier. Since a payload data size less than the MSS of the incoming and outgoing TCP connections may indicate an end of a current data transmission, setting the TCP push flag prompts the destination device (e.g., the one of the client devices 18(1)-18(n)) to push the data to the receiving application and eliminate any delay that may occur for the last portion of data associated with a current transmission. Additionally, setting the TCP push flag in this example facilitates relatively timely pushing of data at a destination device to a receiving application for relatively chatty sending applications that frequently send small payload data.

Referring back to FIG. 4, if the network traffic management apparatus 12 determines in step 410 that the payload data size is not less than the MSS of both the incoming and outgoing TCP connections, then the No branch is taken to step 308 of FIG. 3. In step 308, the network traffic management apparatus 12 sends the packet retrieved from the TCP send buffer 36 without setting the TCP push flag, as described and illustrated in more detail earlier.

While in this example, the conditions in steps 400, 402, 406 and 410 are described and illustrated as occurring in a particular order, the conditions can be tested in other orders in other examples. In the examples described and illustrated herein, one of the conditions in steps 400, 402, 406 and 410 must be satisfied in order to set the TCP push flag for a packet. However, satisfaction of more or fewer conditions for dynamically setting the TCP push flag for a packet can be used in other examples. In one particular example, the condition in step 410 can be tested only in implementations in which the higher layer protocol is not communicating an end of a current transmission of application data, and other permutations can also be used.

Figure 5:
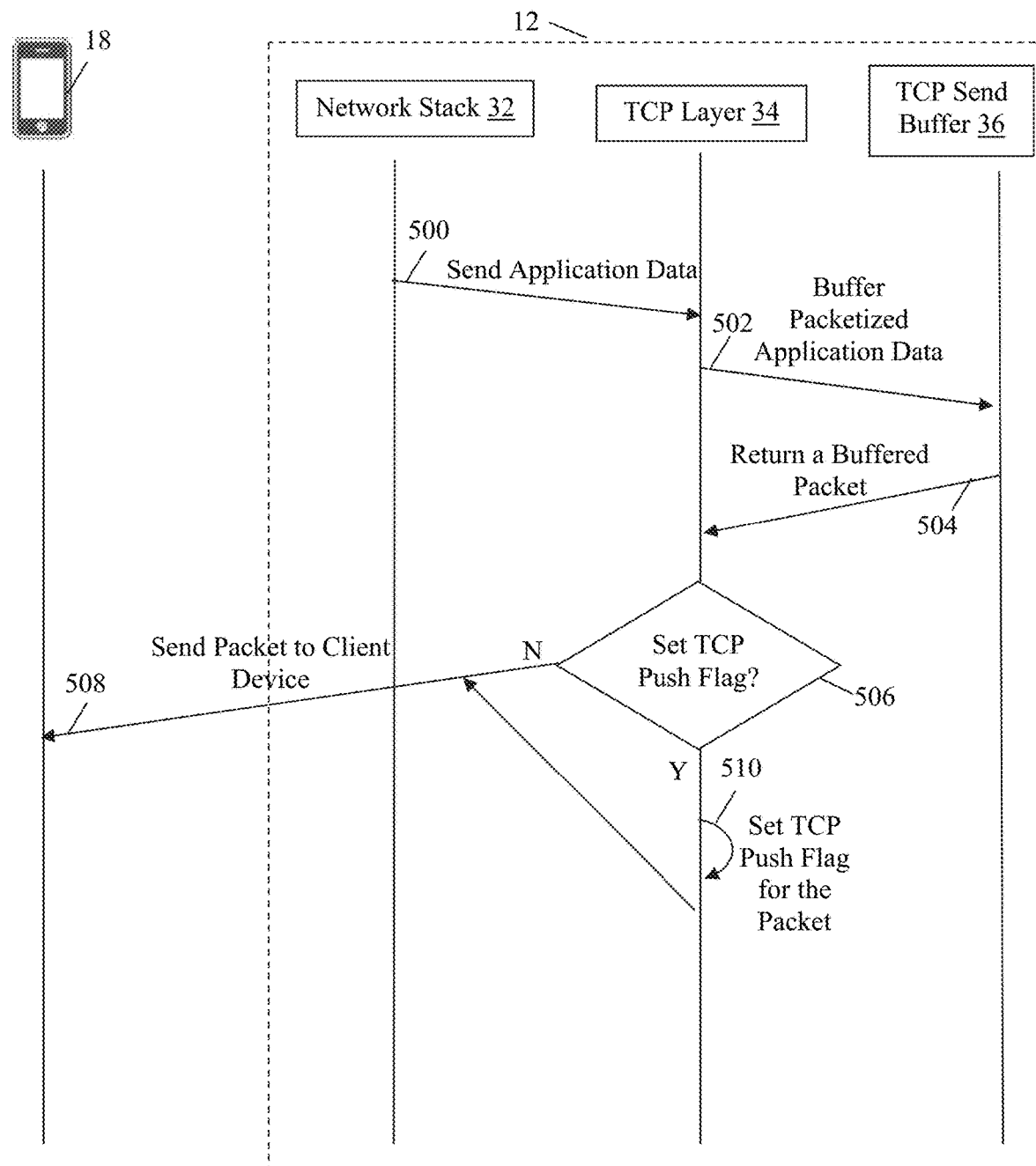
FIG. 5 is a timing diagram of an exemplary method for managing TCP push functionality for a TCP connection.

Referring more specifically to FIG. 5, a timing diagram of an exemplary method for managing TCP push functionality for a TCP connection between the network traffic management apparatus 12 and the client device 18. In step 500 in this example, the network stack 32 of the network traffic management apparatus sends application data received at an upper level (e.g., HTTP level) to the TCP layer 34.

In step 502, the TCP layer 34 processes the application data sent from the network stack 32 to packetize the application data. Once packetized, the TCP layer 34 buffers the packetized application data in the TCP send buffer 36.

In step 504, the TCP send buffer 36 subsequently, or in parallel to step 502 but with respect to another packet, returns one of the packets buffered in the TCP send buffer 36 to the TCP layer 34 in response to a request or other type of prompt from the TCP layer 34. Accordingly, the TCP layer 34 determines that the TCP send buffer 36 is not empty and retrieves a packet to subsequently send to the client device 18.

In step 506, prior to sending the packet to the client device 18, the TCP layer 34 determines whether to set the TCP push flag for the packet. The determination in step 506 can be made based on monitored messages from the application from which the application data originated and/or characteristics of the TCP connection between the network traffic management apparatus 12 and the client device 18, as described and illustrated in more detail earlier with reference to FIG. 4. If the TCP layer 34 determines in step 506 that the TCP push flag should not be set, then the No branch is taken, and the packet is sent by the TCP layer 34 to the client device 18 in step 508.

However, if the TCP layer 34 determines that the TCP push flag should be set, then the Yes branch is taken from step 506 to step 510. In step 510, the TCP layer 34 sets the TCP push flag for the packet before sending the packet to the client device 18 in step 508.

Accordingly, with this technology, setting of the TCP push flag for packets corresponding to TCP segments is dynamically controlled at a source device to minimize delay for a receiving application at a destination device while reducing ACKs. Reducing ACKs advantageously facilitates a corresponding reduction in power utilization, processor cycles required to process the messages, as well as network bandwidth required to transmit the messages, both of which can instead advantageously be used to process, and reduce the latency for, other network traffic.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for managing transmission control protocol (TCP) functionality implemented by a network traffic management system comprising one or more network traffic management apparatuses, server devices, or client devices, the method comprising:
monitoring a message generated by an application or characteristic data of a TCP connection with a destination device or a source device, wherein the message generated is a receive window;
determining when the receive window is less than a threshold to effectively manage network traffic in the TCP connection; and
setting the first TCP push flag for the first packet prior to the first packet being sent to the destination device via the TCP connection, when the determination indicates that the receive window is less than the threshold.

2. The method of claim 1, further comprising:
determining when the monitored message indicates that a current data transmission is complete; and
setting the first TCP push flag for the first packet based on the determination that the monitored message indicates the current data transmission is complete.

3. The method of claim 1, wherein the monitored characteristic data comprises a current round trip time (RTT) of the first TCP connection and the method further comprises:
determining when a second TCP push flag has not been set for a second packet prior to expiration of the current RTT; and
setting the first TCP push flag for the first packet based on the determination that the second TCP push flag has not been set for a second packet prior to expiration of the current RTT.

4. The method of claim 1, wherein the monitored characteristic data comprises a first maximum segment size (MSS) of the TCP connection and a second MSS of another TCP connection with the source device, and the method further comprises:
determining when a size of the application data is less than the first MSS and the second MSS; and
setting the first TCP push flag for the first packet based on the determination that the size is less than the first MSS and the second MSS.

5. A network traffic management apparatus, comprising memory comprising programmed instructions stored thereon and one or more processors configured to be capable of executing the stored programmed instructions to:

monitor a message generated by an application or characteristic data of a TCP connection with a destination device or a source device, wherein the message generated is a receive window;

determine when the receive window is less than a threshold to effectively manage network traffic in the TCP connection; and set the first TCP push flag for the first packet prior to the first packet being sent to the destination device via the TCP connection, when the determination indicates that the receive window is less than the threshold.

6. The network traffic management apparatus of claim 5, wherein the one or more processors are further configured to be capable of executing the stored programmed instructions to:

determine when the monitored message indicates that a current data transmission is complete; and set the first TCP push flag for the first packet based on the determination that the monitored message indicates the current data transmission is complete.

7. The network traffic management apparatus of claim 5, wherein the monitored characteristic data comprises a current round trip time (RTT) of the first TCP connection and the one or more processors are further configured to be capable of executing the stored programmed instructions to:

determine when a second TCP push flag has not been set for a second packet prior to expiration of the current RTT; and set the first TCP push flag for the first packet based on the determination that the second TCP push flag has not been set for a second packet prior to expiration of the current RTT.

8. The network traffic management apparatus of claim 5, wherein the monitored characteristic data comprises a first maximum segment size (MSS) of the TCP connection and a second MSS of another TCP connection with the source device, and the one or more processors are further configured to be capable of executing the stored programmed instructions to:

determine when a size of the application data is less than the first MSS and the second MSS; and set the first TCP push flag for the first packet based on the determination that the size is less than the first MSS and the second MSS.

9. A non-transitory computer readable medium having stored thereon instructions for managing transmission control protocol (TCP) functionality comprising executable code that, when executed by one or more processors, causes the one or more processors to:

monitor a message generated by an application or characteristic data of a TCP connection with a destination device or a source device, wherein the message generated is a receive window;

determine when the receive window is less than a threshold to effectively manage network traffic in the TCP connection; and set the first TCP push flag for the first packet prior to the first packet being sent to the destination device via the TCP connection, when the determination indicates that the receive window is less than the threshold.

10. The non-transitory computer readable medium of claim 9, wherein the executable code, when executed by the one or more processors, further causes the one or more processors to:

determine when the monitored message indicates that a current data transmission is complete; and set the first TCP push flag for the first packet based on the determination that the monitored message indicates the current data transmission is complete.

11. The non-transitory computer readable medium of claim 9, wherein the monitored characteristic data comprises a current round trip time (RTT) of the first TCP connection and the executable code, when executed by the one or more processors, further causes the one or more processors to:

determine when a second TCP push flag has not been set for a second packet prior to expiration of the current RTT; and set the first TCP push flag for the first packet based on the determination that the second TCP push flag has not been set for a second packet prior to expiration of the current RTT.

12. The non-transitory computer readable medium of claim 9, wherein the monitored characteristic data comprises a first maximum segment size (MSS) of the TCP connection and a second MSS of another TCP connection with the source device, and the executable code, when executed by the one or more processors, further causes the one or more processors to:

determine when a size of the application data is less than the first MSS and the second MSS; and set the first TCP push flag for the first packet based on the determination that the size is less than the first MSS and the second MSS.

13. A network traffic management system, comprising one or more network traffic management apparatuses, server devices, or client devices with memory comprising programmed instructions stored thereon and one or more processors configured to be capable of executing the stored programmed instructions to:

monitor a message generated by an application or characteristic data of a TCP connection with a destination device or a source device, wherein the message generated is a receive window;

determine when the receive window is less than a threshold to effectively manage network traffic in the TCP connection; and set the first TCP push flag for the first packet prior to the first packet being sent to the destination device via the TCP connection, when the determination indicates that the receive window is less than the threshold.

14. The network traffic management system of claim 13, wherein the one or more processors are further configured to be capable of executing the stored programmed instructions to:

determine when the monitored message indicates that a current data transmission is complete; and set the first TCP push flag for the first packet based on the determination that the monitored message indicates the current data transmission is complete.

15. The network traffic management system of claim 13, wherein the monitored characteristic data comprises a current round trip time (RTT) of the first TCP connection and the one or more processors are further configured to be capable of executing the stored programmed instructions to:

extract the receive window from a header of an acknowledgement message received from the destination device;

determine when the receive window is less than a threshold; and set the first TCP push flag for the first packet based on the determination that the second TCP push flag has not been set for a second packet prior to expiration of the current RTT.

16. The network traffic management system of claim 13, wherein the monitored characteristic data comprises a first maximum segment size (MSS) of the TCP connection and a second MSS of another TCP connection with the source device, and the one or more processors are further configured to be capable of executing the stored programmed instructions to:
- determine when a size of the application data is less than the first MSS and the second MSS; and
- set the first TCP push flag for the first packet based on the determination that the size is less than the first MSS and the second MSS.

\* \* \* \* \*